3,210,330
POLYMERIZATION PROCESS AND PRODUCTS
Otto E. van Lohuizen, Arnhem, and Herman J. Geursen, Velp, Gelderland, Netherlands, assignors to N.V. Onderzoekingsinstituut Research, Arnhem, Netherlands, a corporation of the Netherlands
No Drawing. Filed July 27, 1962, Ser. No. 213,042
Claims priority, application Netherlands, Aug. 10, 1961, 268,101
5 Claims. (Cl. 260—93.1)

The present invention relates to a process for the preparation of polymers of certain alkenes, wherein the polymerization takes place at a temperature below 0° C. under the influence of an acid catalyst, and to the resulting polymer products.

Such a process, broadly, is know and is used, inter alia, for the preparation of polymeric products such as polyisobutene, poly-α-methylstyrene and polyisoprene.

More particularly, the present invention relates to a process of the type indicated above wherein at least one of the alkenes is a monomethylenemonocycloalkane having at least 6 carbon atoms in the ring.

The polymers prepared according to the present invention have very special and desirable properties, since in the molecules thereof there are carbon atoms in the chain which form part of a ring system the other atoms of which are not included in the chain. In the homopolymers thus prepared said chain molecules are consequently very rigid, a feature which manifests itself in the resulting desirable properties of these polymers, which properties correspond somewhat to those of the polycarbonates. From a chemical viewpoint, however, they are more desirable than the polycarbonates in that they cannot hydrolize and are highly resistant to oxidation. Moreover, they have the favorable property that they absorb very little water, so that even in a damp atmosphere articles made of these polymers have very good dimensional stability. Owing to their low water absorption capacity, polymers manufactured according to the present invention are also very suitable for electrical applications.

The monomethylenemonocycloalkanes which are suitable for employment in the process of the present invention are per se known compounds, and include methylenecyclohexane, methylenecycloheptane, methylenecyclooctane, etc. Monomethylenemonocycloalkanes whose rings contain substituents which are inert under the reaction conditions, such as alkyl groups, and especially lower alkyl groups having from 1 to 4 carbon atoms, are also suitable for employment in the process according to the present invention. Examples of such latter compounds are monoethylmonomethylenecyclohexane, in which the methyl group may be in the 2-, 3- or 4-position.

According to the present invention not only homopolymers or monomethylenemonocycloalkanes may be prepared, but also copolymers obtained by starting from a mixture of monoethylenemonocycloalkanes or from a mixture of one or more monomethylenemonocycloalkanes and one or more different unsaturated copolymerizable compounds, such as 1,3-butadiene, isoprene, isobutene, α-methyl styrene, styrene, etc. Co-polymerization thus being possible as well as homopolymerization, it thus becomes possible to prepare polymers having widely varying properities as a result of which the various polymers prepared according to the present invention find practical application in a great many fields.

The process according to the present invention may be carried out under a wide variety of conditions such as are broadly known for the polymerization of other alkenes, for instance isobutene.

Suitable polymerization catalysts are acid catalysts, for instance the halides of metals of groups III and IV of the periodic system according to Mendeleeff, such as aluminum chloride aluminium bromide, tin tetrachloride, and titanium tetrachloride, as well as compounds such as boron trifluoride and the like. To the catalyst may be added a co-catalyst, such as ethanol or the like.

The amount of catalyst used may vary between wide limits. In general, the best results are obtained using from 0.1 to 1.0 mole percent, calculated on the amount of monomer. Generally speaking, if a catalyst is used in solution, a smaller amount is required than if it is used in the solid state.

The polymerization reaction is preferably carried out in a solvent for the monomers used. Suitable solvents are those that have been employed in previously known polymerization reactions, for instance halogenated lower hydrocarbons which are liquid at the reaction temperature employed. Very good results are obtained when using alkyl halides, and especially lower alkyl halides such as methyl chloride and ethyl chloride. The solvents employed should be carefully purified before use, since traces of impurities, such as water, influence the reaction speed and the degree of polymerization of the final polymer very unfavorably. For this reason it is generally preferred to carry out the process according to the present invention in an atmosphere of a dry inert gas, such as for instance nitrogen.

The polymers prepared according to the present invention may have widely varying degrees of polymerization. In general, the degree of polymerization is dependent on the reaction conditions, such as temperature, concentration of the monomer, the nature of the solvent, the nature and concentration of the catalyst, the nature and concentration of possible impurities, etc. In fact, not only the degree of polymerization but also the molecular weight distribution, the reaction speed, and the yield are highly dependent on the reaction conditions. These reaction conditions are preferably so chosen that polymers having a mean degree of polymerization higher than 200 and preferably higher than 500 are obtained, because polymers whose degree of polymerization is lower have unfavorable properties. For example, the dimer is entirely unsuitable for any practical application. By preference, the polymerization reaction is carried out at a temperature below $-80°$ C., because in this way polymers having the desired high degree of polymerization are readily obtained.

Processes have been described for the polymerization of dimethylenecycloalkanes and dimethylenecycloalkenes, such as 3,5-dimethylenecyclohexane and 2,3-dimethylenebicyclo-(2:2:2)octane, and of monomethylenebicycloalkanes such as β-pinene. These known processes, however, yield polymers having a molecular structure which is entirely different from that of the polymers prepared according to the present invention, in consequence of which the resulting polymers have properties which likewise are entirely different from those of polymers prepared according to the present invention.

The present invention not only includes the above-mentioned process and the polymers produced thereby, but also the shaped articles made partially or completely of these novel polymers.

In order to indicate still more fully the nature of the present invention, the following examples of typical procedures are set forth, it being understood, however, that this description is presented by way of illustration only, and not as limiting the scope of the invention.

*Example 1*

A reaction vessel is cooled to $-120°$ C. with the aid of a mixture of liquid nitrogen and ethanol. Dry, pure nitrogen is passed through this vessel for one hour. The passing through of nitrogen is continued, and 50 parts by weight of ethyl chloride and 4 parts by weight of methylenecyclohexane are admitted to the vessel.

The ethyl chloride is previously purified by distilling it a few times and subsequently distilling it a few more times from phosphorus pentoxide. The methylenecyclohexane is prepared by the gas-phase pyrolysis of the acetate of cyclohexylcarbinol. Prior to use, the monomer is dried by distilling it from metallic sodium. Gas-phase chromatography shows it to be pure to the extent of at least 99.5%.

To the mixture in the reaction vessel there is added, wtih stirring, 0.046 part by weight of aluminum chloride which is dissolved in a small amount of dry ethyl chloride.

After the mixture has been stirred for some time, a colorless precipitate of the polymer is formed. The mixture is then allowed to return to room temperature, the precipitate being partially dissolved. The residue is dissolved in pure carbon tetrachloride. The resulting solution is washed with an aqueous solution of sodium hydroxide and subsequently with water, dried with water-free sodium sulphate and subsequently poured out into dry methanol, the polymer thereby separating out as a fine, white precipitate.

The polymer is separated by centrifugation and dried in vacuo. The yield is 3.9 parts by weight, which is 97% of the theoretical yield.

By dissolving the polymer in carbon terachloride and pouring the resulting viscous solution onto a flat plate, a film having useful properties may be obtained.

The polymer of methylenecyclohexane thus obtained is amorphous. By heating it above 100° C. or by treating it with solvents such as benzene, it assumes a modified structure which is crystalline according to X-ray and infrared spectrography.

Example II

In the manner and following the procedure of Example I a mixture of 35 parts by weight of ethyl chloride, 8 parts by weight of methylenecyclohexane and 0.052 part by weight of aluminum chloride are brought into reaction in a cooled reaction vessel. The components of said mixture are purified, prior to reaction, in the manner described in Example I.

Upon completion of the reaction, the mixture is allowed to return to room temperature, after which it is poured out into methanol. The precipitate thus formed is filtered off, dissolved in carbon tetrachloride, and the resulting solution is poured out into methanol. The precipitate thus formed is filtered off, and dried. The polymer yield is 8 parts by weight and is therefore quantitative. After the polymer has been converted to the crystalline state by treatment with benzene, its melting point is 210° C.

Example III

In the manner and following the procedure of Example I a mixture of 105 parts by weight of methyl chloride, 16 parts by weight of methylenecyclohexane, and 0.022 part by weight of aluminum chloride are brought into reaction in a cooled reaction vessel. The components of the mixture are purified prior to reaction in the manner already described in Example I.

Upon completion of the reaction, the polymer is separated off in the manner of Example I. In this way, 15.5 parts by weight of a colorless thread-and-film-forming polymer of methylenecyclohexane are obtained.

Example IV

To a reaction vessel, which has been cooled to —120° C. wtih the aid of low-boiling petroleum ether and liquid nitrogen, there is admitted a mixture of 8 parts by weight of methylenecyclohexane and 37 parts by weight of dry ethyl chloride, pure dry nitrogen being passed through the vessel. Pure dry boron trifluoride is passed over the mixture for 3 minutes, with stirring, as a result of which polymerization takes place, which is apparent from the formation of a precipitate and the rising temperature of the reaction mixture.

The temperature of the mixture is allowed to rise to 0° C. and the polymer is separated off in the manner already described in Example I. The yield is 8 parts by weight.

The amorphous polymer of methylenecyclohexane is soluble in benzene, but after some time it precipitates therefrom as crystalline polymer. The crystalline polymer may be dissolved in dichlorobenzene by heating, after which it may be spun to a thread or cast into a film by per se conventional techniques.

Example V

To a reaction vessel, which has been cooled to a temperature of —125° C., there is admitted a mixture of 28 parts by weight of dry ethyl chloride, 0.20 part by weight of aluminum chloride as catalyst and 0.07 part by weight of ethanol as cocatalyst. To this mixture are added 6.0 parts by weight of methylenecyclohexane. During polymerization, which takes a few minutes, the temperature varies between —115° C. and —125° C. The polymer is separated off in the manner already described in Example I. Yield: 2.65 parts by weight of polymethylenecyclohexane.

Example VI

To a reaction vessel, which has been cooled to a temperature of —125° C., are admitted 40 parts by weight of dry ethyl chloride. To this are added 9 parts by weight of methylenecyclohexane. To the resulting solution there is added four times, at intervals of five minutes, 0.5 part by weight of a 16.5% by weight solution of freshly distilled titanium tetrachloride in pure hexane. During the polymerization process the temperature varies between —110° C. and —120° C. The methylcyclohexane polymer is separated from the reaction mixture in the manner already described in Example I. Yield: 1.85 parts by weight of polymethylenecyclohexane. This polymer may be converted into shaped polymer products by conventional spinning and casting techniques.

Example VII

To a reaction vessel, which has been cooled to —165° C. with the aid of liquid nitrogen, is admitted a mixture of 29 parts by weight of dry pure ethylchloride, 58 parts by weight of dry pure vinylchloride and 3 parts by weight of dry pure 2-methyl methylenecyclohexane which has been prepared by pyrolysis of the corresponding methyl-substituted cyclohexyl carbinol acetate.

To the cooled mixture, which is kept under nitrogen atmosphere, is added with stirring a solution of 0.004 part by weight of pure aluminiumchloride in 1 part by weight of pure dry ethylchloride. A colourless precipitate of polymer is instantaneously formed. After 10 minutes, 5 parts of methanol are added to neutralize the catalyst. The polymer is separated and purified in the manner described in Example 1. 1.2 parts by weight of a colourless film and thread forming polymer are obtained.

Example VIII

In the manner of Example VII a polymer is prepared starting from 3 parts by weight of 3-methyl methylene cyclohexane.

2.4 parts by weight of poly 3-methyl methylenecyclohexane are obtained. The polymer obtained is thread forming.

Example IX

In the manner of Example VII a polymer is prepared starting from 3 parts by weight of 4-methyl methylenecyclohexane.

2.7 parts by weight of poly 4-methyl methylenecyclohexane are obtained. The clear polymer obtained is thread forming.

Example X

To a reaction vessel, which has been cooled to —172° C. is admitted a mixture of 36 parts by weight of pure dry ethylchloride, 72 parts by weight of pure dry vinylchloride and 4 parts by weight of pure dry methylenecyclohexane. To the cooled mixture is added a solution of 0.004 part by weight of pure aluminiumchloride in 4 parts by weight of pure ethylchloride. The mixture is stirred while the reaction mixture is kept in an atmosphere of pure dry nitrogen. The polymer precipitates instantaneously. After 30 minutes methanol is added and the polymer is separated in the manner described in Example 1. The yield is 100%. The polymer is colourless and film and thread forming.

While specific examples of preferred methods embodying the present invention have been set forth above, it will be understood that many changes and modifications may be made in the method of procedure without departing from the spirit of the invention. It will therefore be understood that the examples cited and the particular proportions and methods of operation set forth above are intended to be illustrative only, and are not intended to limit the scope of the invention.

What is claimed is:

1. A process for the preparation of a thread-and-film-forming homopolymer of a monomethylenecyclohexane comprising subjecting monomethylenecyclohexane to polymerization conditions including a temperature below —80° C. and a metal halide catalyst where the metal is selected from the class consisting of Groups III and IV metals and the halide has an atomic number of at least 17.

2. A process for the preparation of a thread-and-film-forming homopolymer of a monomethylenecycloalkane, comprising subjecting a reaction mixture containing a compound selected from the class consisting of (a) monomethylenecycloalkanes having at least 6 carbon atoms in the ring and (b) lower alkyl ring-substituted derivatives of (a), to polymerization conditions including a temperature below —80° C. and a metal halide catalyst, the metal being selected from the class consisting of groups III and IV metals and the halide having an atomic number of at least 17.

3. Thread-and-film-forming homopolymers of a monomethylenecyclohexane having a repeating structural unit of the formula

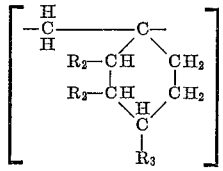

wherein $R_1$, $R_2$ and $R_3$ are monovalent substituents selected from the group consisting of hydrogen and lower alkyl groups, said polymers having a mean degree of polymerization higher than 200.

4. Thread-and-film-forming homopolymers of a monomethyl ring-substituted monomethylenecyclohexane, whose mean degree of polymerization is higher than 200, according to claim 3.

5. Thread-and-film-forming homopolymonomethylenecyclohexane whose mean degree of polymerization is higher than 200, having a repeating structural unit of the formula

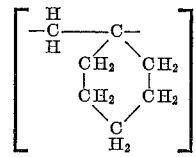

References Cited by the Examiner

UNITED STATES PATENTS

| | | | |
|---|---|---|---|
| 2,436,256 | 2/48 | Hanford et al. | 260—94.9 |
| 2,600,454 | 6/52 | Wicklatz et al. | 260—93.1 |

JOSEPH L. SCHOFER, *Primary Examiner.*

UNITED STATES PATENT OFFICE
CERTIFICATE OF CORRECTION

Patent No. 3,210,330

October 5, 1965

Otto E. van Lohuizen et al.

It is hereby certified that error appears in the above numbered patent requiring correction and that the said Letters Patent should read as corrected below.

Column 1, lines 50 and 51, for "monoethylmonomethylenecyclohexane" read -- monomethylmonomethylenecyclohexane --; column 5, line 26, strike out "a"; column 6, lines 7 to 14, for that portion of the formula reading

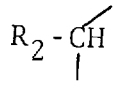   read   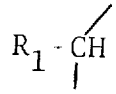

Signed and sealed this 5th day of July 1966.

(SEAL)
Attest:

ERNEST W. SWIDER
Attesting Officer

EDWARD J. BRENNER
Commissioner of Patents